US012203870B2

(12) United States Patent
Chen et al.

(10) Patent No.: US 12,203,870 B2
(45) Date of Patent: Jan. 21, 2025

(54) MEASUREMENT SYSTEM AND MEASUREMENT METHOD

(71) Applicant: Skyverse Technology Co., Ltd., Shenzhen (CN)

(72) Inventors: Lu Chen, Shenzhen (CN); Le Yang, Shenzhen (CN); Yanzhong Ma, Beijing (CN); Wei Zhang, Shenzhen (CN); Xiaohui Li, Shenzhen (CN)

(73) Assignee: Skyverse Technology Co., Ltd., Shenzhen (CN)

( * ) Notice: Subject to any disclaimer, the term of this patent is extended or adjusted under 35 U.S.C. 154(b) by 178 days.

(21) Appl. No.: 17/924,032

(22) PCT Filed: May 9, 2020

(86) PCT No.: PCT/CN2020/089487
§ 371 (c)(1),
(2) Date: Nov. 8, 2022

(87) PCT Pub. No.: WO2021/226765
PCT Pub. Date: Nov. 18, 2021

(65) Prior Publication Data
US 2023/0175980 A1   Jun. 8, 2023

(51) Int. Cl.
*G01N 21/95* (2006.01)
(52) U.S. Cl.
CPC ................. *G01N 21/9501* (2013.01)
(58) Field of Classification Search
CPC ............... G01N 21/9501; G01B 11/24
See application file for complete search history.

(56) References Cited

U.S. PATENT DOCUMENTS

| 11,662,198 | B2 * | 5/2023 | Kelkar | G03F 7/70641 |
| | | | | 250/459.1 |
| 2011/0075887 | A1 * | 3/2011 | Tanaka | G02B 6/4221 |
| | | | | 156/64 |
| 2011/0122420 | A1 | 5/2011 | Jansen et al. | |

FOREIGN PATENT DOCUMENTS

| CN | 101050949 A | 10/2007 |
| CN | 101275822 A | 10/2008 |

(Continued)

OTHER PUBLICATIONS

International Search Report and Written Opinion for Application No. PCT/CN2020/089487, dated Jan. 27, 2021.

*Primary Examiner* — Hung V Nguyen
(74) *Attorney, Agent, or Firm* — MARSHALL, GERSTEIN & BORUN LLP

(57) ABSTRACT

The present disclosure provides a measurement system and a measurement method related to the field of measurement techniques, the measurement system comprising: a light source configured to produce an original beam, wherein a return beam is formed by the original beam returning from a measured area of a measured object; an optical assembly configured to obtain a pending beam based on the return beam, wherein at least part of the pending beam acts as a first beam; a first detection device configured to obtain first detection information based on the first beam; a mobile device configured to move the optical assembly and the measured object with respect to each other in a direction of an optical axis of the optical assembly; and a processing system configured to determine an actual distance between the optical assembly and a fixed plane of the measured object at each first moment according to the first detection information at each first moment of a plurality of first moments.

18 Claims, 8 Drawing Sheets

(56) References Cited

FOREIGN PATENT DOCUMENTS

| | | | |
|---|---|---|---|
| CN | 102589463 | A | 7/2012 |
| CN | 108917626 | A | 11/2018 |
| CN | 109084678 | A | 12/2018 |

\* cited by examiner

MEASUREMENT SYSTEM AND MEASUREMENT METHOD

TECHNICAL FIELD

The present disclosure relates to the field of measurement techniques, and in particular to a measurement system and a measurement method.

BACKGROUND

In the field of integrated circuit manufacturing, to improve product yield, the three-dimensional morphology of a wafer needs to be measured to check whether the wafer manufacturing process meets the standards. The three-dimensional topography measurement method based on white light interference technology is widely used in the field of integrated circuit detection with its features such as non-contact, fast and high accuracy.

White light interference technology uses white light with a very short coherent length as the light source to locate the surface topography of the measured object by the peak of the interference signal intensity.

SUMMARY

A measurement system is provided according to one aspect of the present disclosed embodiment, the measurement system comprises: a light source configured to produce an original beam, wherein a return beam is formed by the original beam returning from a measured area of a measured object; an optical assembly configured to obtain a pending beam based on the return beam, wherein at least part of the pending beam acts as a first beam; a first detection device configured to obtain first detection information based on the first beam; a mobile device configured to move the optical assembly and the measured object with respect to each other in a direction of an optical axis of the optical assembly; and a processing system configured to determine an actual distance between the optical assembly and a fixed plane of the measured object at each first moment according to the first detection information at each first moment of a plurality of first moments.

In some embodiments, the optical assembly comprises: a first splitter configured to divide the original beam into a reference beam and an object beam incident into the measured area, wherein the return beam is formed by the object beam returning from the measured area; and a reference mirror configured to propagate the reference beam along a preset trajectory to obtain a pre-interference beam, wherein the pre-interference beam and the return beam are interfered to obtain the pending beam; the first detection information includes intensity of a light with a predetermined wavelength of the pending beam.

In some embodiments, the processing system configured to determine an actual distance between the optical assembly and a fixed plane of the measured object at each first moment comprises: controlling the mobile device such that the optical assembly and the measured object are moved with respect to each other in the direction of the optical axis, so that there are a desired plurality of predetermined distances between the optical assembly and the fixed plane at a plurality of second moments; obtaining the first detection information at each second moment of the plurality of second moments; and determining the actual distance between the optical assembly and the fixed plane at each first moment based on the plurality of predetermined distances and the plurality of first detection information at each second moment.

In some embodiments, he processing system configured to determine the actual distance between the optical assembly and the fixed plane at each first moment based on the plurality of predetermined distances and the plurality of first detection information at each second moment comprises: linear processing each predetermined distance of the plurality of predetermined distances to obtain a moving parameter; taking a difference between the moving parameter and a undecided parameter at each second moment as an independent variable and the first detection information at each second moment as the dependent variable to fit a function to be fitted to obtain a fitting function; and determining the actual distance between the optical assembly and the fixed plane at each first moment according to the fitting function and the first detection information at the plurality of the first moments.

In some embodiments, the optical assembly comprises: a first splitter configured to divide the original beam into a reference beam and an object beam incident into the measured area, wherein the return beam is formed by the object beam returning from the measured area; and a reference mirror configured to propagate the reference beam along a preset trajectory to obtain a pre-interference beam, wherein the pre-interference beam and the return beam are interfered to obtain the pending beam; the first detection information includes intensity of a light with a predetermined wavelength of the pending beam; the fitting function is: $I = A + \cos r(x-x_0) + B$, wherein the linear process includes being multiplied by $2\Pi/\lambda$, $r=1$; or the linear process includes being multiplied by 1, $r=2\Pi/\lambda$ is a wavelength of the light with a predetermined wavelength, the processing system configured to take a difference between the moving parameter and the undecided parameter at each second moment as an independent variable and the first detection information at each second moment as the dependent variable to fit a function to be fitted to obtain a fitting function includes: taking the moving parameter at each second moment as an x of the fitting function, taking the intensity of the light with the predetermined wavelength at each second moment as the I of the fitting function to fit the fitting function to obtain A, the undecided parameter x0 and B to obtain the fitting function; determining the actual distance between the optical assembly and the fixed plane at each first moment according to the fitting function and first detection information at the plurality of the first moments includes: taking intensity of the light with the predetermined wavelength at each first moment as I in the fitting function to compute the x of the fitting function as the moving parameter at each first moment; and determining the actual distance between the optical assembly and the fixed plane at each first moment according to the moving parameter at each first moment.

In some embodiments, the reference mirror is configured to propagate the reference beam along a preset trajectory by reflecting the reference beam to obtain a pre-interference beam; the reference mirror and the first splitter are semi-translucent mirrors, and the reference mirror and the first splitter are arranged in parallel; or the reference mirror is a mirror.

In some embodiments, the first detection device comprises: a grating or a filter; and a light intensity detector.

In some embodiments, the measurement system further comprises: a first diaphragm configured to block a portion of the pending beam into the first detection device, wherein an angle between a central axis of the pending beam and the portion is greater than a first preset angle.

In some embodiments, the measurement system further comprises: a second detection device configured to obtain second detection information according to a second beam, the second beam is a portion of the return beam or a portion of the pending beam, the second detection information characterizes a relative distance between the optical assembly and the measured area in the direction of the optical axis of the optical assembly; the processing system is further configured to obtain a first moment when the second detection information is preset detection information as a feature moment; obtain the actual distance between the optical assembly and the fixed plane at the feature moment; determine height information of the measured area according to the actual distance between the optical assembly and the fixed plane at the feature moment.

In some embodiments, the second detection device configured to obtain a second detection information according to the second beam comprises: obtaining a detection image according to the second beam; and obtaining the second detection information according to the detection image, the second detection information includes at least one of light intensity of the second beam and contrast of the detection image.

In some embodiments, the measurement system further comprises: a second splitter configured to split the return beam or the pending beam to obtain the second beam.

In some embodiments, the optical assembly further comprises: a first lens configured to collect the return beam, the first beam is formed by the return beam collected by at least part of the first lens; or the first lens configured to collect the pending beam, the first beam is formed by the pending beam collected by at least part of the first lens.

In some embodiments, when the first lens is configured to collect the return beam, the second splitter is configured to split the return beam collected by the first lens to form the second beam and a third beam, the optical assembly is configured to obtain the pending beam according to the third beam; when the first lens is configured to collect the pending beam, the second splitter is configured to split the pending beam collected by the first lens to form the first beam and the second beam.

In some embodiments, the optical assembly further comprises: a second lens configured to collect the second beam.

In some embodiments, the second splitter is configured to split the return beam to obtain the second beam, the second lens makes the center axis of the second beam parallel to the direction of movement of the optical assembly; the second splitter is fixedly connected to the optical assembly.

In some embodiments, the optical assembly is configured to move with respect to the second splitter.

In some embodiments, the second splitter is configured to split the return beam to obtain the second beam; the optical assembly includes a lens configured to collect the return beam and propagate the return beam to the second splitter, or configured to collect the second beam; the measurement system further comprises: a second diaphragm configured to block a portion of the second beam into the second detection device, an angle between the portion of the second beam and the central axis of the second beam is greater than a second preset angle, the second diaphragm and the second detection device are conjugated with the focal plane of the lens.

In some embodiments, the original beam includes a first original beam and a second original beam; the light source includes: a first sub-light source configured to produce the first original beam, and a second sub-light source configured to produce the second original beam; the return beam includes a first return beam and a second return beam, the first return beam is the first original beam returned from the measured area, the second return beam is the second original beam returned from the measured area; the optical assembly includes: a first optical assembly configured to form the pending beam according to the first return beam, the first beam is the pending beam, and a second optical assembly configured to collect the second return beam, the second beam is the second return beam, the first optical assembly is fixedly connected to the second optical assembly.

In some embodiments, the first optical assembly is further configured to collect the first original beam to enable the first original beam arrive to the measured area; the first optical assembly includes: a dispersive prism configured to converge lights with different wavelengths of the first original beam to different positions of the optical axis of the first optical assembly.

In some embodiments, a data acquisition system configured to emit a synchronous trigger signal at each first moment; the first detection device configured to obtain the first detection information based on the first beam in response to the synchronous trigger signal; the second detection device configured to obtain the second detection information according to the second beam in response to the synchronous trigger signal.

In some embodiments, the second detection information includes the light intensity of the second beam; the light intensity of the second beam at the feature moment is greater than the light intensity of the second beam at any first moment of the plurality of the first moment in addition to the feature moment.

In some embodiments, the measured area includes at least one subarea, the detection image includes at least one pixel corresponding to the at least one subarea, each pixel is configured to obtain a second beam of a subarea; the second detection information includes light intensity of a second beam formed by each subarea, wherein at the feature moment of any subarea, the gray level value of pixels of the subarea is greater than the gray scale value of the pixels at any first moment of the plurality of the first moment in addition to the feature moment; the processing system configured to determine the height information of the measured area according to the actual distance between the optical assembly and the fixed plane at the feature moment includes: determining the height information of the subarea according to the actual distance between the optical assembly and the fixed plane at the feature moment of each subarea to obtain the height information of the measured area.

A measurement method is provided according to another aspect of the present disclosed embodiment, the measurement method comprises: producing an original beam by a light source, wherein the original beam returned from the measured area of the measured object is a return beam; obtaining a pending beam based on the return beam by an optical assembly, at least part of the pending beam acts as a first beam; obtaining first detection information based on the first beam; moving the optical assembly and the measured object with respect to each other in a direction of an optical axis of the optical assembly; and determining an actual distance between the optical assembly and a fixed plane at each first moment according to the first detection information at each first moment in a plurality of first moments.

In some embodiments, determining an actual distance between the optical assembly and the measured object at each first moment comprises: moving the optical assembly and the measured object with respect to each other in the direction of the optical axis, such that there are a desired plurality of predetermined distances between the optical assembly and the fixed plane at a plurality of second moments; obtaining the first detection information at each second moment of the plurality of second moments; and determining the distance between the optical assembly and the fixed plane at each first moment based on the plurality of predetermined distances and the plurality of first detection information at each second moment.

In some embodiments, determining the actual distance between the optical assembly and the fixed plane at each first moment based on the plurality of predetermined distances and the plurality of first detection information at each second moment comprises: linear processing each predetermined distance of the plurality of predetermined distances to obtain a moving parameter; taking a difference between the moving parameter and a undecided parameter at each second moment as an independent variable and the first detection information at each second moment as the dependent variable to fit a function to be fitted to obtain a fitting function; and determining the actual distance between the optical assembly and the fixed plane at each first moment according to the fitting function and the first detection information at the plurality of the first moments.

In some embodiments, the optical assembly includes a first splitter and a mirror, the measurement method further comprising: dividing the original beam into a reference beam and an object beam incident into the measured area by the first splitter, wherein the return beam is the object beam returned from the measured area returning to the optical assembly; and propagating the reference beam along a preset trajectory to obtain a pre-interference beam by the reference mirror, wherein the pre-interference beam and the return beam are interfered to obtain the pending beam; the first detection information includes intensity of a light with the predetermined wavelength of the pending beam; the fitting function is: $I=A+\cos r(x-x_0)+B$, wherein the linear process includes being multiplied by $2\Pi/\lambda$, $r=1$; or the linear process includes being multiplied by 1, $r=2\Pi/\lambda$, $\lambda$ is a wavelength of the light with a predetermined wavelength; taking a difference between the moving parameter and the undecided parameter at each second moment as an independent variable and the first detection information at each second moment as the dependent variable to fit a function to be fitted to obtain a fitting function includes: taking the moving parameter at each second moment as an x of the fitting function, taking the intensity of the light with the predetermined wavelength at each second moment as the I of the fitting function to fit the fitting function to obtain A, the undecided parameter x0 and B to obtain the fitting function; determining the actual distance between the optical assembly and the fixed plane at each first moment according to the fitting function and first detection information at the plurality of the first moments includes: taking the intensity of the light with the predetermined wavelength at each first moment as I of the fitting function to compute the x of the fitting function as the moving parameter at each first moment; and determining the actual distance between the optical assembly and the fixed plane at each first moment according to the moving parameter at each first moment.

In some embodiments, the measurement method further comprises: obtaining second detection information according to a second beam, the second beam is a portion of the return beam or a portion of the pending beam, the second detection information characterizes a relative position between the optical assembly and the measured area; obtaining a first moment when the second detection information is preset detection information as a feature moment; and obtaining the actual distance between the optical assembly and the fixed plane at the feature moment; determining height information of the measured area according to the actual distance between the optical assembly and the fixed plane at the feature moment.

In some embodiments, obtaining second detection information according to the second beam comprises: obtaining a detection image according to the second beam; and obtaining the second detection information according to the detection image, the second detection information includes at least one of light intensity of the second beam and contrast of the detection image.

In some embodiments, the second detection information includes the light intensity of the second beam; the light intensity of the second beam at the feature moment is greater than the light intensity of the second beam at any first moment of the plurality of the first moment in addition to the feature moment.

In some embodiments, the measurement method further comprising: obtaining topography of the measured object according to height information of a plurality of the measured area relative to a same datum.

By the following detailed description of exemplary embodiments of the present disclosure with reference to the accompanying drawings, other features, aspects and advantages of the present disclosure will become apparent.

BRIEF DESCRIPTION OF THE DRAWINGS

The drawings are part of the present specification, which describes exemplary embodiments of the present disclosure, and together with the specification serve to explain the principles of the present disclosure, in the drawings.

It should be understood that the dimensions of the parts shown in the drawings are not drawn according to the actual proportional relationship. In addition, the same or similar reference numbers represent identical or similar components.

DETAILED DESCRIPTION

Figure 1:
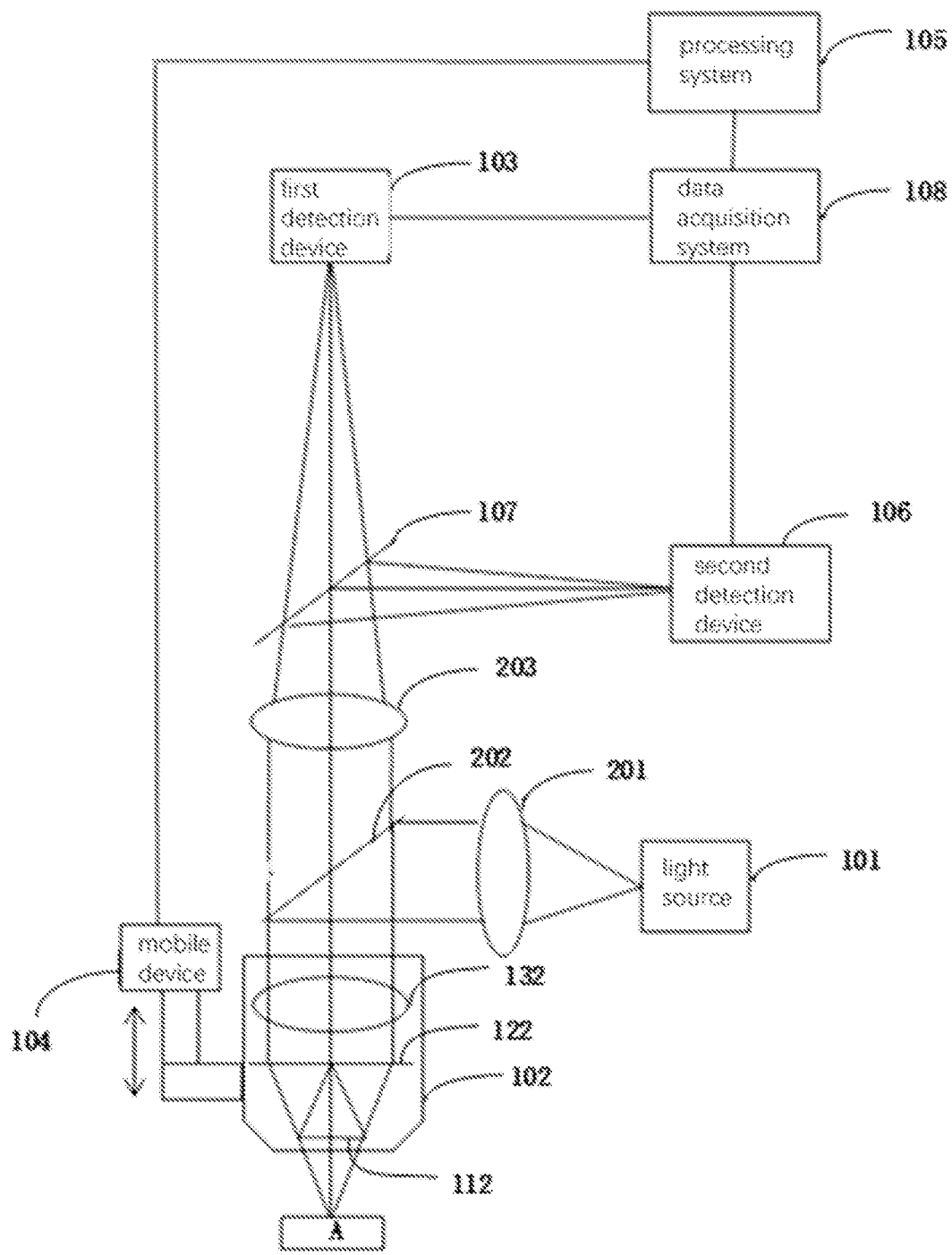
FIG. 1 is a structural view of the measurement system according to some embodiments of the present disclosure.

Various exemplary embodiments of the present disclosure will now be described in detail with reference to the accompanying drawings. The description of exemplary embodiments is only illustrative and in no way serves as any restriction on the present disclosure and its application or use. The present disclosure may be implemented in many different forms, not limited to the embodiments described herein. These embodiments are provided to make the present disclosure thorough and complete, and to fully express the scope of the present disclosure for those skilled in the art. It should be noted that unless otherwise specified, the relative arrangement of the components and steps described in these embodiments, components of the material, numeric expressions and numerical values should be interpreted as merely exemplary, and not as limitations.

The words "first", "second", and similar words used in the present disclosure do not indicate any order, quantity, or importance, but are only used to distinguish different parts. A similar term such as "including" or "containing" means that the elements preceding the term cover the elements listed after the word, and does not exclude the possibility that other elements are also covered. "Up", "down", etc. are used only to represent relative position relationships, and when the absolute position of the object being described changes, the relative position relationship may change accordingly.

In the present disclosure, when a particular assembly located between the first and second parts is described, the intermediary assembly may be present between the particular component and the first or second component, there may not be an intermediary component. When a particular member connected to other components is described, the particular component may be directly connected to the other components without having an intermediary component, may not be directly connected to the other components and have an intermediary component.

All terms used in the present disclosure (including technical terms or scientific terms) have the same meanings as those of ordinary skill in the art to which the present disclosure belongs, unless otherwise specifically defined. It should also be understood that terms defined in such a general dictionary should be interpreted as having meanings consistent with their meaning in the context of the relevant technology, without applying idealized or extremely formal meanings to be interpreted, unless explicitly defined herein.

Techniques, methods and devices known to those of ordinary skill in the relevant art may not be discussed in detail, but where appropriate, the techniques, methods and devices should be considered as part of the specification.

The inventors note that when driving the optical assembly to move with respect to the measured object relative, due to the movement error, the vibration of the measurement system, environmental vibration and other factors, it is desirable that the predetermined distance between the optical assembly and the fixed plane of the measured object is often not the same as the actual distance between the optical assembly and the fixed plane of the measured object. Therefore, measuring the height information of the measured object according to the predetermined distance will lead to inaccurate measurement results.

In view of this, the present disclosed embodiment provides the following technical solutions.

FIG. 1 is a structural view of a measurement system according to some embodiments of the present disclosure.

As shown in FIG. 1, the measurement system may include a light source 101, an optical assembly 102, a first detection device 103, a mobile device 104 and a processing system 105.

The light source 101 is configured to produce an original beam. In some embodiments, the original beam may be a broad spectrum beam, such as white light, infrared light, and ultraviolet light in one or more combinations. Here, the original beam returned from the measured area of the measured object A (e.g., wafer, etc.) is the return beam.

In some embodiments, the original beam produced by the light source 101 may be directly incident to the measured object. In other embodiments, referring to FIG. 1, the original beam generated by the light source 101 may be incident to the measured object A via the optical assembly 102. For example, the original beam produced by the light source 101 may be incident to the spectrometer 202 after shaping by the shaping lens set 201, and incident to the optical assembly 102 after reflection by the splitter 202, and then incident to the measured object A via the optical assembly 102. For example, the shaping lens set 201 may collimate, filter the original beam produced by the light source 101.

The optical assembly 102 is configured to obtain a pending beam based on the return beam. Here, at least part of the pending beam is the first beam.

In some embodiments, the optical assembly 102 may be an interference objective. In this case, the pending beam can be an interference beam. In other embodiments, the optical assembly 102 may be a confocal objective. In this case, the pending beam may be a return beam returned from the measured object A. The optical assembly 102 is configured to divide the original beam into a reference beam and an object beam incident into the measured area, wherein the object beam returning to the optical assembly from the measured area forms a return beam, the optical assembly 102 is also configured to make the reference beam interfere with the return beam.

For example, the optical assembly 102 includes a first splitter 112 and a reference mirror 122, the first splitter 112 is configured to divide the original beam into a reference beam and an object beam incident into the measured area of the measured object A; the reference mirror 122 is configured to propagate the reference beam along a preset trajectory to obtain a pre-interference beam, wherein the pre-interference beam and the return beam are interfered to obtain the pending beam.

In one embodiment, the first splitter 112 is configured to divide the original beam into a reference beam and an object beam incident into the measured area of the measured object A. Here, the object beam returning to the optical assembly 102 from the measured area of the measured object A is the return beam. The reference mirror 122 is configured to propagate the reference beam along a preset trajectory by reflecting the reference beam to obtain a pre-interference beam. Here, the pre-interference beam and the return beam are interfered to obtain the pending beam. For example, the reference mirror 122 and the first splitter 112 are semi-translucent mirrors, and the reference mirror 122 and the first splitter 112 are arranged in parallel. However, the present disclosed embodiment is not limited thereto. For example, in other embodiments, the reference mirror 122 may be a mirror (e.g., the embodiment shown in FIG. 6).

In other embodiments, the reference mirror 122 is configured to refract or diffract the reference beam to obtain a pre-interference beam. For example, the reference mirror 122 is a refractive element or a diffraction element.

The first detection device 103 is configured to obtain the first detection information based on the first beam. In some embodiments, the pending beam is an interference beam obtained by interference of the above-mentioned reflected beam and the return beam. In this case, the first detection information may include the intensity of a light with a predetermined wavelength of the pending beam. For example, a pending beam includes lights with multiple wavelengths. The light with a predetermined wavelength can be any light with any wavelength of lights with multiple wavelengths.

The mobile device 104 is configured to move the optical assembly 102 and the measured object A with respect to each other in a direction of an optical axis of the optical assembly.

For example, the mobile device 104 may drive the optical assembly 102 to move with respect to the measured object A in the optical axis direction of the optical assembly 102 under the control of the processing system 105. Further, the mobile device 104 may drive the measured object A to move with respect to the optical assembly 102 in the direction of the optical axis of the optical assembly 102 under the control of the processing system 105. Here, the direction of the optical axis of the optical assembly 102 may be understood as the central axis direction of the return beam incident into the optical assembly 102, such as the direction pointed by the bidirectional arrow in FIG. 1. In some embodiments, the mobile device 104 may be a phase shifter.

Movement in the optical axis direction of the optical assembly 102 with respect to the measured object A refers to the directions of movements of the optical assembly 102 and the measured object A having a component along the optical axis direction of the optical assembly 102, the directions of movements of the optical assembly 102 and the measured object A is are not perpendicular to the optical axis direction of the optical assembly 102.

The processing system 105 is configured to determine the actual distance between the optical assembly 102 and the fixed plane of the measured object A according to the first detection information at each first moment of a plurality of first moments. Here, the fixed plane of the measured object A may be a plane determined by any area of the surface of the measured object A. In other words, any plane of the measured object A can be used as the fixed plane of the measured object A.

It should be understood that the actual distances between the optical assembly 102 and the fixed plane of the measured object A at different first moments are different. For example, the processing system 105 may subsequently determine the height information of the measured area according to the actual distance between the optical assembly 102 and the fixed plane of the measured object A at each first moment.

The processing system 105 may be a computer or other device capable of processing. In some embodiments, the processing system 105 may include a memory and a processor coupled to the memory, the processor may perform various operations based on instructions stored on the memory, e.g., determining the actual distance between the optical assembly 102 and the fixed plane of the measured object A at each first moment and the operations mentioned herein. The memory may include, for example, a system memory, fixed nonvolatile storage medium and the like. The system memory may store an operating system, applications, boot loaders and other programs.

In the above embodiment, the optical assembly 102 obtains a pending beam based on the return beam, the first detection device 103 obtains the first detection information according to at least a portion of the pending beam (i.e., the first beam). The processing system 105 determines the actual distance between the optical assembly 102 and the fixed plane of the measured object A at each first moment according to the first detection information at each first moment. In this manner, the actual distance between the optical assembly 102 and the fixed plane of the measured object A at each first moment can be obtained using a plurality of first detection information. Subsequent operation can be performed more accurately based on the actual distance between the optical assembly 102 and the fixed plane of the measured object A at each first moment, e.g., the height information of the measured area of the measured object A can be more accurately determined.

In some embodiments, referring to FIG. 1, the measurement system may further include a second detection device 106. The second detection device 106 is configured to obtain second detection information according to the second beam. Here, the second beam is a portion of the pending beam. For example, the measurement system further comprises a second splitter 107 configured to split the pending beam to obtain a second beam. For example, the pending beam through the second splitter 107 is the first beam, and the pending beam reflected by the second splitter 107 is a second beam, and vice versa. In other embodiments, the second beam may a portion of the return beam. In this case, the second splitter 107 is configured to split the return beam to obtain a second beam. The present invention will hereinafter be described in conjunction with other embodiments (e.g., the embodiment shown in FIG. 6).

The second detection information can characterize the relative distance between the optical assembly 102 and the measured area of the measured object A in the direction of the optical axis of the optical assembly, i.e., the second detection information changes with the change of relative distance; the relative distance between the optical assembly 102 and the measured area of the measured object A can be obtained according to the second detection information.

In some embodiments, the second detection device 106 may obtain a detection image (e.g., an interference image or an image of the measured area of the measured object A) according to the second beam, and then obtain second detection information according to the detection image. The second detection device 106 may be, for example, a camera, a video camera, etc. In other embodiments, the second detection device 106 may be a single photodiode or photomultiplier.

Here, the second detection information may include at least one of the light intensity of the second beam and the contrast of the detection image. For example, the second detection information may include the light intensity of the second beam. For example, the second detection information may include the contrast of the detection image obtained according to the second beam. For another example, the second detection information may include the light intensity of the second beam and the contrast of the detection image.

The processing system 105 is also configured to a first moment when the second detection information is preset detection information as a feature moment; obtain the actual distance between the optical assembly 102 and the fixed plane of the measure object A at the feature moment; determine height information of the measured area according to the actual distance between the optical assembly and the fixed plane at the feature moment.

In some embodiments, the second detection information may include the light intensity of the second beam. The light of the second beam at the feature moment is greater than the light intensity of the second beam at any of the first moments of a plurality of first moments in addition to the feature moment. In other words, the light intensity of the second beam is greatest at the feature moment. For example, at the feature moment, the optical path of the reference beam is equal to the optical path of the object beam. For another example, at the feature moment, the distance between the measured area of the optical assembly 102 and the measured object A is equal to the focal length of the optical assembly 102.

For different measured areas, at the feature moment, the distances between the optical assembly 102 and different measured areas are same. Thus, the actual distance between the optical assembly 102 and the fixed plane of the measured object A at the feature moment may reflect the height of the measured area. For example, for the measured area A1, the actual distance between the optical assembly 102 and the fixed plane of the measured object A at the feature moment is h1; for the measured area A2, the actual distance between the optical assembly 102 and the fixed plane of the measured object A at the feature moment is h2. The difference between h1 and h2 is the height difference between the measured area A1 and the measured area A2.

In some embodiments, the measured area includes at least one subarea, the detection image includes at least one pixel corresponding to at least one subarea. For example, the measured area includes a plurality of subareas, the detection image comprises a plurality of pixels corresponding to a plurality of subareas. The second detection information may include the light intensity of the second beam obtained by each pixel. In this case, the preset detection information is the maximum grayscale value of the pixel. The feature moment is the first moment of the highest grayscale value. Each pixel has a feature moment, that is, each subarea corresponds to a feature moment. At the feature moment of each subarea, the gray level value of the pixel corresponding to that subarea is greater than the gray scale value of the pixel at any first moment of a plurality of first moments in addition to the feature moment. In other words, for some pixel, the pixel has the largest grayscale value at the feature moment.

In other embodiments, the preset detection information is the value when the mean or sum of the grayscale values of a plurality of pixels is maximal; the feature moment is the first moment when the mean or sum of the grayscale values of a plurality of pixels is maximal.

The processing system 105 is configured to determine the height information of each pixel corresponding to the subarea according to the actual distance between the optical assembly 102 and the fixed plane at the feature moment. After obtaining the height information of the subarea corresponding to each pixel, the height information of the measured area is obtained.

The actual distance between the optical assembly 102 and the fixed plane of the measured object A at the feature moment corresponding to the subarea may reflect the height of the subarea. For example, for the subarea A11 of the measured area A, the actual distance between the optical assembly 102 and the fixed plane of the measured object A at the feature moment is h11; for the subarea A12 of the measured area A, the actual distance between the optical assembly 102 and the fixed plane of the measured object A at the feature moment is h12. The difference between h11 and h12 is the height difference between subarea A11 and subarea A12.

In some embodiments, a measurement system may be used to measure a plurality of measured areas of the measured object, thereby obtaining height information of each measured area with respect to the same datum. After obtaining the height information of each measured area relative to the same datum, the three-dimensional topography of the measured object can be obtained. For example, pieces of the height information of a plurality of measured areas can be stitched together to achieve a three-dimensional topography of the measured object.

In some embodiments, referring to FIG. 1, the measurement system further comprises a data acquisition system 108 configured to i emit a synchronous trigger signal at each first moment of a plurality of first moments. The first detection device 103 is configured to obtain the first detection information based on the first beam in response to the synchronous trigger signal. The second detection device 106 is configured to obtain the second detection information according to the second beam in response to the synchronous trigger signal. Thus, the first detection device 103 may obtain a plurality of first detection information at a plurality of first moments, the second detection device 106 may obtain a plurality of second detection information at a plurality of first moments. The data acquisition system 108 may collect a plurality of first detection information at a plurality of first moments from the first detection device 103, and collect a plurality of second detection information at a plurality of first moments from the second detection device 106, and propagate them to the processing system 105.

Different implementations of the first detection device 103 are described with in conjunction with FIG. 2 and FIG. 3 below. It should be noted that each embodiment in the present specification is described in a progressive manner, each embodiment focuses on the differences from other embodiments, and the same or similar portions among the various embodiments can refer to each other.

Figure 2:
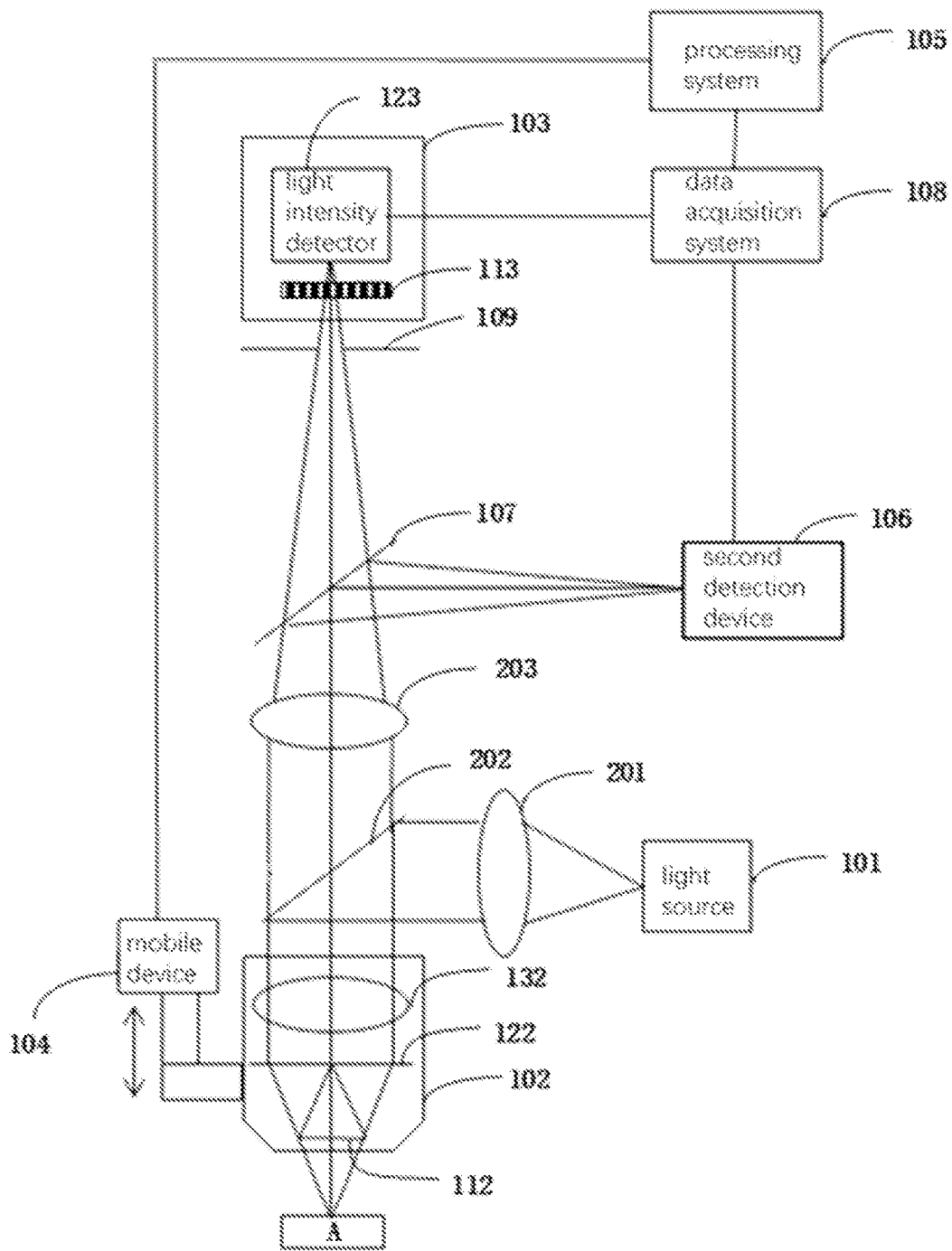
FIG. 2 is a structural view of the measurement system according to other embodiments of the present disclosure.

FIG. 2 is a structural view of a measurement system according to other embodiments of the present disclosure.

As shown in FIG. 2, the first detection device 103 is a spectrometer. For example, the first detection device 103 may include a grating 113 and a light intensity detector 123 (e.g., a photodetector). The grating 113 is configured to make lights with different wavelengths of the first beam incident to different areas of the light intensity detector 123, i.e., grating 113 has a spectroscopic effect. The light intensity detector 123 is configured to detect the light intensity of lights with a plurality of wavelengths of the first beam. The processing system 105 may analyze based on the light intensity of the light with a predetermined wavelength (i.e., the first detection information) of lights with a plurality of wavelengths.

Figure 3:
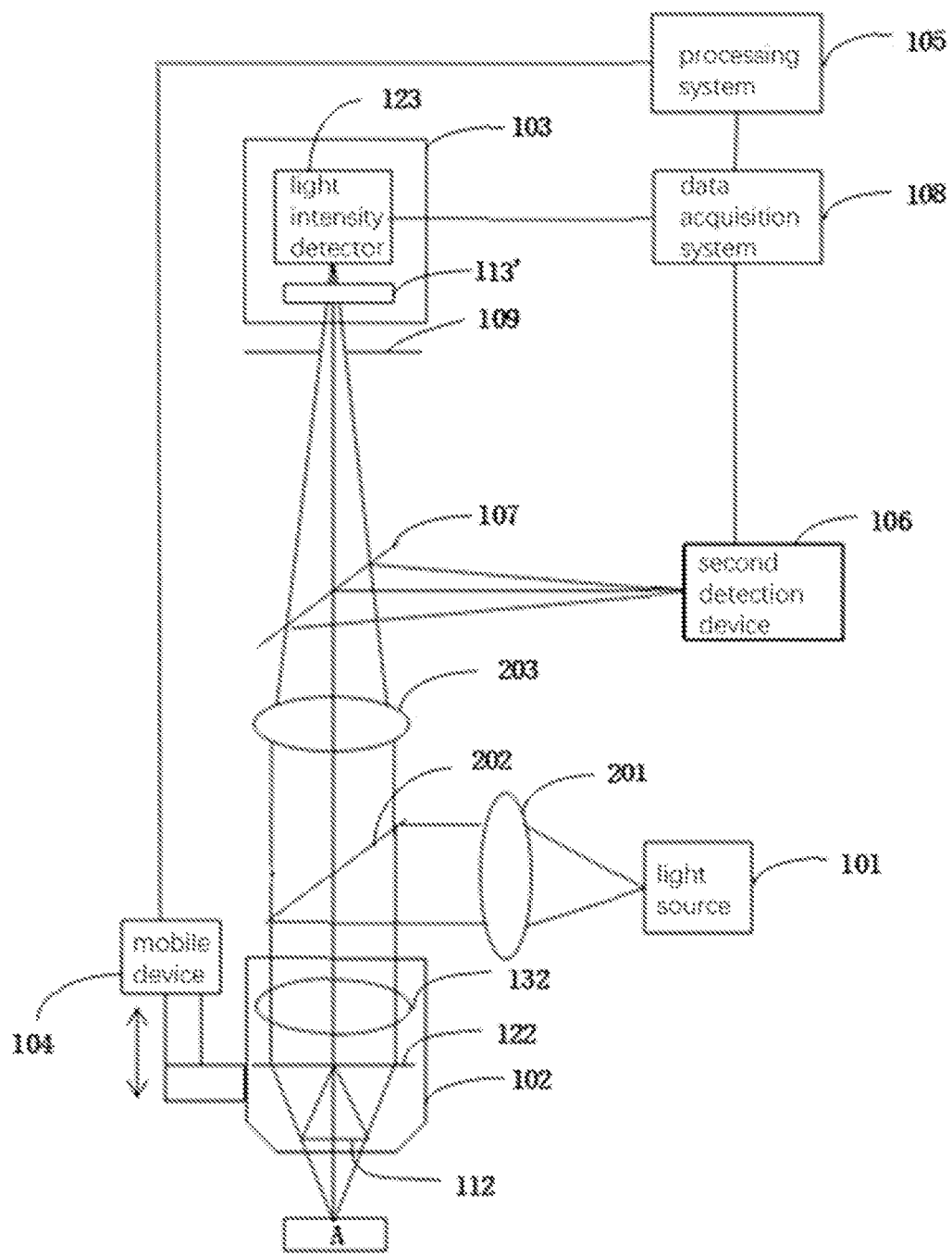
FIG. 3 is a structural view of the measurement system according to further embodiments of the present disclosure.

FIG. 3 is a structural view of a measurement system according to other embodiments of the present disclosure.

As shown in FIG. 3, the first detection device 103 may include a filter 113' and a light intensity detector 123. Filter 113' is configured to enable the light with a predetermined wavelength of lights with a plurality of wavelengths of the first beam arrive to the light intensity detector 123, and enable lights with other wavelengths not arrive to the light intensity detector 123. In other words, filter 113' only allows the light with a predetermined wavelength to pass through. In this case, the light intensity detector 123 may directly detect the intensity of the light with a predetermined wavelength.

In some embodiments, referring to FIG. 2 and FIG. 3, the measurement system may further include a first diaphragm 109, e.g., aperture diaphragm. The first diaphragm 109 is configured to block a portion of the pending beam into the first detection device 103, wherein an angle between a central axis of the pending beam and the portion is greater than a first preset angle. In other words, a portion of the pending beam enters into the first detection device 103, wherein the angle between a central axis of the pending beam and the portion is less than or equal to the first preset angle. It should be understood that the first preset angle can be determined according to the actual situation. In this case, the first detection device 103 does not need to detect the entire pending beam, which reduces the adverse effects of the light at the edge of the pending beam to improve the detection accuracy.

Some specific implementations of the processing system to determine the actual distance between the optical assembly and the fixed plane of the measured object at each first moment are described in conjunction with FIG. 4 and FIG. 5 below.

Figure 4:
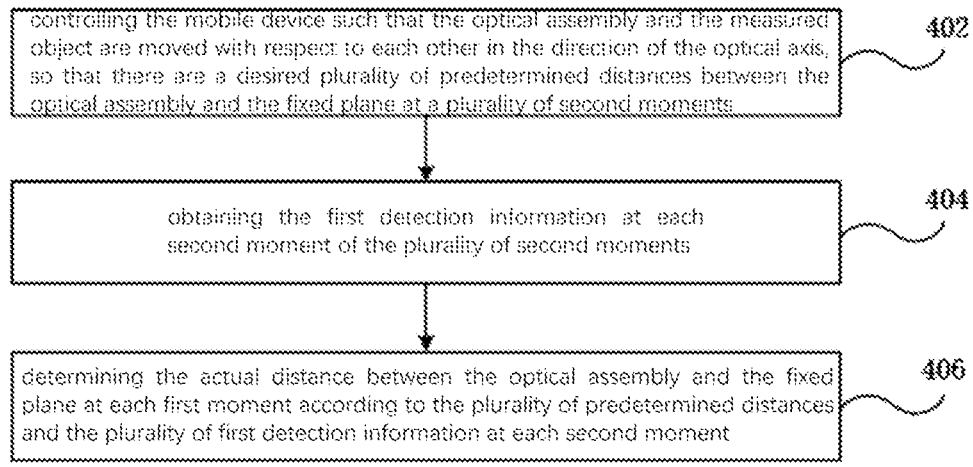
FIG. 4 is a flowchart of determining the actual distance between the optical assembly and the fixed plane of the measured object at each first moment according to some implementations of the present disclosure.

FIG. 4 is a flowchart of determining the actual distance between the optical assembly and the fixed plane of the measured object at each first moment according to some implementations of the present disclosure.

In step 402, controlling the mobile device such that the optical assembly and the measured object are moved with respect to each other in the direction of the optical axis, so that there are a desired plurality of predetermined distances between the optical assembly and the fixed plane at a plurality of second moments.

Here, a plurality of second moments and a plurality of first moments may be the same, may be different, or, may be partially the same.

Controlling the mobile device so that the optical assembly and the measured object move with respect to each other in the direction of the optical axis include: the mobile device moves the optical assembly, or the mobile device moves the measured object.

In step 404, obtaining the first detection information at each second moment of the plurality of second moments.

In step 406, determining the actual distance between the optical assembly and the fixed plane at each first moment based on the plurality of predetermined distances and the plurality of first detection information at each second moment.

When the mobile device moves only the optical assembly, determining the actual distance between the optical assembly and the fixed plane of the measured object at each first moment includes determining the distance between the optical assembly and any fixed plane at each first moment; when the mobile device only moves the measured object, determining the actual distance between the optical assembly and the fixed plane of the measured object at each first moment includes determining the distance between the optical assembly and any fixed plane at each first moment.

Figure 5:
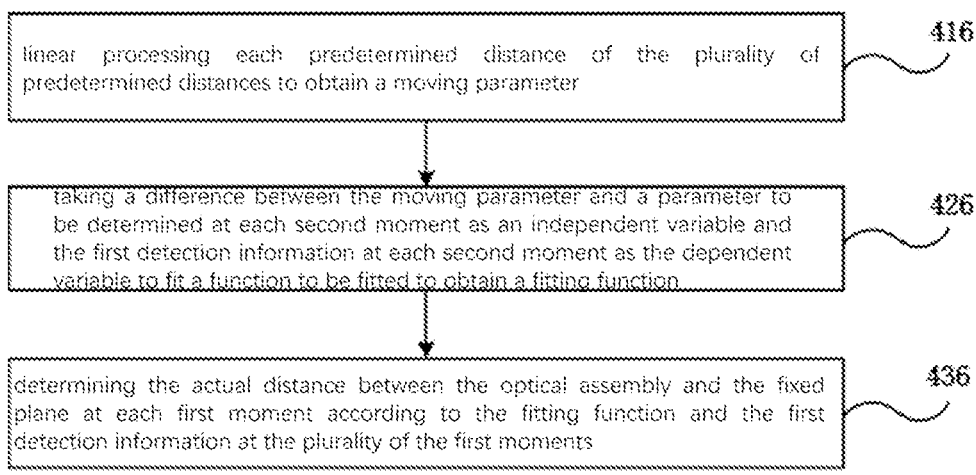
FIG. 5 shows a specific implementation of step 406 in FIG. 4.

For example, step 406 may be achieved by steps 416-436 shown in FIG. 5.

In step 416, linear processing each predetermined distance of the plurality of predetermined distances to obtain a moving parameter. For example, each predetermined distance is multiplied by a constant to obtain a moving parameter.

In step 426, taking a difference between the moving parameter and a undecided parameter at each second moment as an independent variable and the first detection information at each second moment as the dependent variable to fit a function to be fitted to obtain a fitting function.

For example, the fitting function may include trigonometric expansions, polynomials, Fourier expansions and the like.

In step 436, determining the actual distance between the optical assembly and the fixed plane at each first moment according to the fitting function and the first detection information at the plurality of the first moments.

Taking the optical assembly 102 including a first splitter 112 and a reference mirror 122 and the fitting function as a trigonometric function as an example below, some specific implementations of steps 416-436 are described. The functions of the first splitter 112 and the reference mirror 122 may be described with reference to the above description, which will not be repeated here.

In this implementation, the first detection information includes the intensity of light with a predetermined wavelength of the pending beam. The fitting function is: $I = A + \cos r(x-x_0) + B$. Here, A is the amplitude of the light intensity of the light with a predetermined wavelength, $x_0$ is the undecided parameter, B is the mean intensity of the light intensity of the light with the predetermined wavelength, r is 1 or $2\Pi/\lambda$, and $\lambda$ is the wavelength of the light with the predetermined wavelength. In the case of linear processing in step 416 multiplied by $2\Pi/\lambda$, $r=1$, the moving parameter is the amount of phase shift; in the case of the linear processing in step 416 is multiplied by 1, $r=2\Pi/\lambda$, the moving parameter is equal to the predetermined distance.

For example, taking the moving parameter at each second moment as the x in the fitting function, and the intensity of the light with a predetermined wavelength at each second moment as the I in the fitting function, the fitting function is fitted to obtain A, the parameters to be determined x0, and B, to obtain the fitting function.

For example, the intensity of the light with a predetermined wavelength at a plurality of second moments is $I_1$, $I_2$, and $I_3$ . . . , and the moving parameters at a plurality of second moments are $x_{01}$, $x_{02}$, $x_{03}$ . . . $X_{01}$, $x_{02}$, $x_{03}$ . . . are taken as x, and $I_1$, $I_2$, $I_3$ . . . are taken as I to fit the upper equation, such as the least squares fitting, so that A, $x_0$ and B can be obtained, that is, the fitting function is obtained.

After obtaining A, $x_0$, and B, the relationship between the light intensity I and the moving parameter x of the light with the predetermined wavelength is obtained. After that, the intensity of the light with the predetermined wavelength at each first moment is taken as the I in the fitting function to compute x in the fitting function as the moving parameter at each first moment.

For example, the intensity of a plurality of lights with a predetermined wavelength at the first moment $I_1'$, $I_2'$, $I_3'$ . . . are substituted into the fitting function to obtain a plurality of the moving parameters $x_{11}$, $x_{12}$, $x_{13}$ . . . .

Then, the actual distance between the optical assembly and the fixed plane at each first moment is determined based on the moving parameter at each first moment.

For example, the actual distance between the optical assembly and the fixed plane at each first moment is equal to the moving parameter at each first moment. For another example, the actual distance between the optical assembly and the fixed plane at each first moment is equal to the ratio of the moving parameter to $2\Pi/\lambda$, at each first moment.

The relationship between the light intensity the light with the predetermined wavelength and the moving parameter are compliant with the above formula, so the above equation is a function to be fitted to simplify the computing process and improve the detection speed.

It should be noted that the processing system 105 may fit the corresponding A, $x_0$ and B in accordance with the above manner when detecting each measured area, and then subsequent processing. In this way, the actual distance between the optical assembly and the fixed plane at the first moment is more accurate, so that more accurate height information of the measured area can be obtained.

It should also be noted that when the fitting function is a trigonometric function expansion, polynomial, or Fourier expansion, it is possible to process the fitted function for trigonometric fitting, polynomial fitting, or Fourier series fitting.

Figure 6:
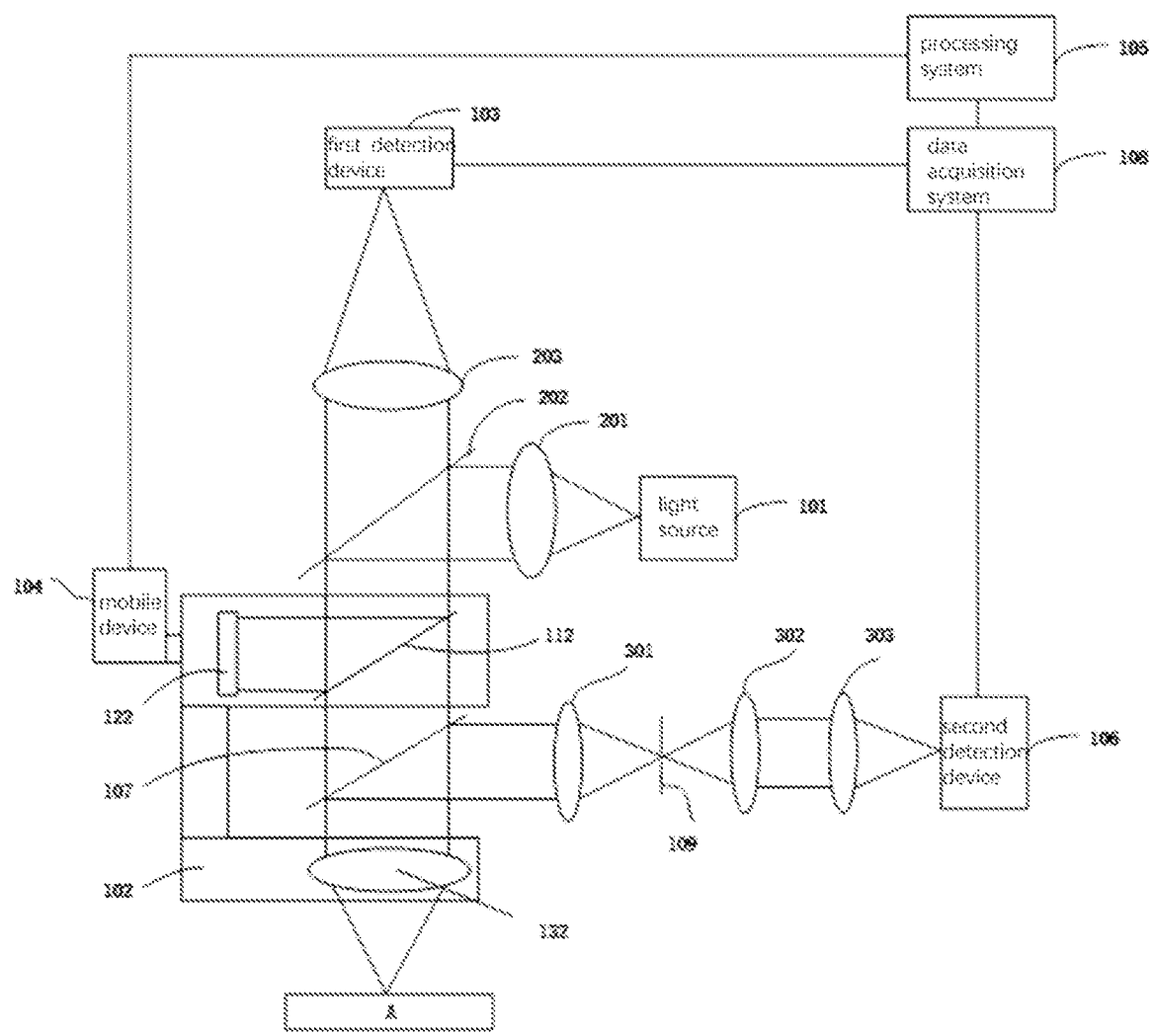
FIG. 6 is a structural view of the measurement system according to further embodiments of the present disclosure.

FIG. 6 is a structural view of a measurement system according to further embodiments of the present disclosure.

Figure 7:
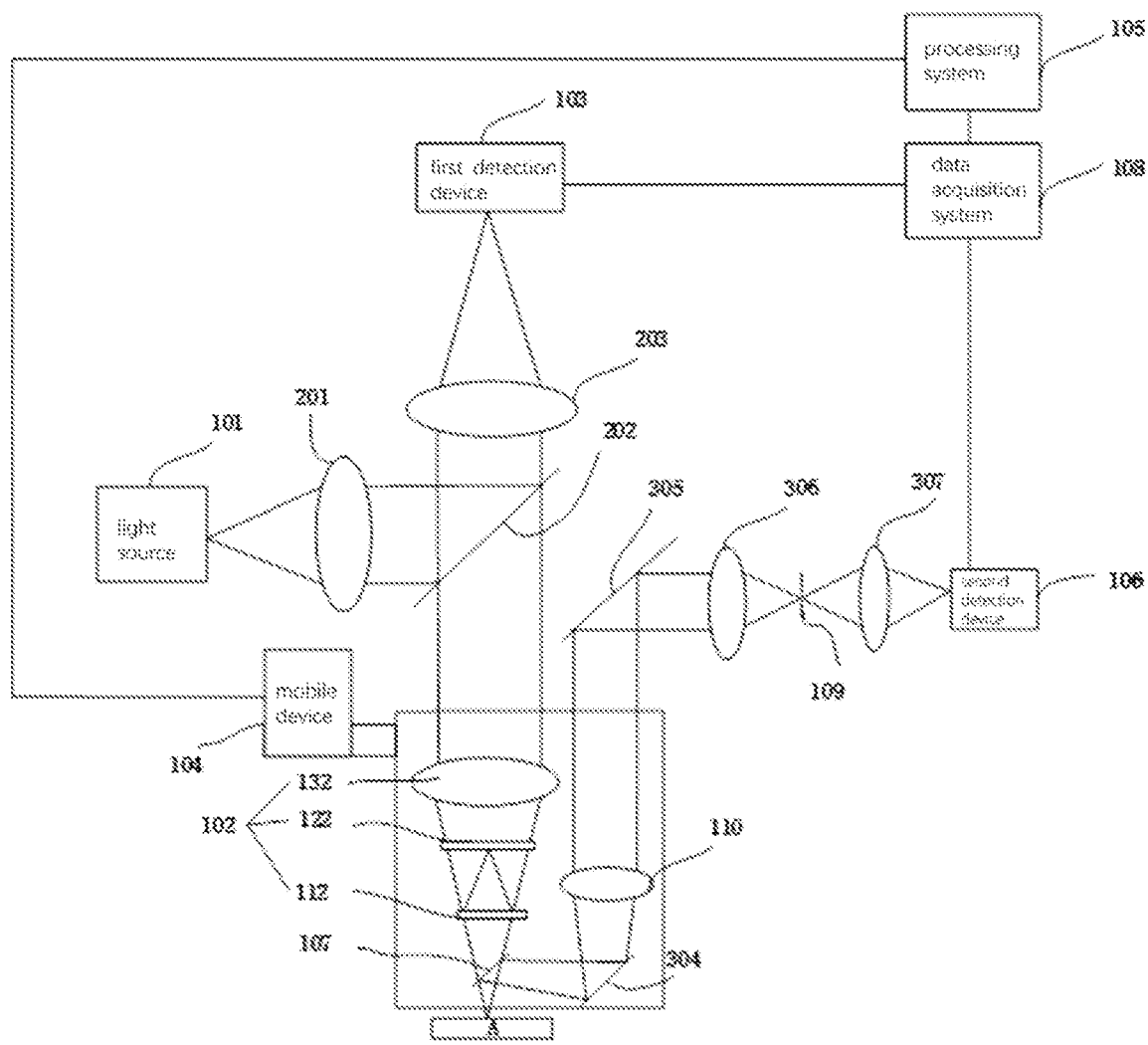
FIG. 7 is a structural view of the measurement system according to some further embodiments of the present disclosure.

FIG. 7 is a structural view of a measurement system according to some embodiments of the present disclosure.

The measurement system according to some embodiments of the present disclosure is illustrated in conjunction with FIGS. 1-3, and FIGS. 6-7 below. It should be noted that in the following description, the functions of the same or similar components in different embodiments are not described.

In some embodiments, the optical assembly 102 may include a first lens 132. The first lens 132 may be configured to collect a return beam or a pending beam. The following is illustrated in conjunction with different embodiments.

In some embodiments, referring to FIG. 6, the optical assembly 102 further comprises a first lens 132 configured to collect the return beam. In this case, the first beam is formed by the return beam collected by at least part of the first lens 132.

In some embodiments, referring to FIG. 6, when the first lens 132 is configured to collect a return beam, the second splitter 107 is configured to split the return beam collected by the first lens 132 to form a second beam and a third beam. The optical assembly 102 is configured to obtain a pending beam according to the third beam. The second detection device 106 obtains the second detection information according to the second beam. For example, the third beam through the first splitter 112 and the reflected beam reflected by the first splitter 112 are interfered to obtain a pending beam.

In some embodiments, referring to FIG. 6, in the case that the first lens 132 is configured to collect the return beam, the optical assembly 102 is configured to move with respect to the second splitter 107. For example, in the case that the mobile device 104 drives the optical assembly 102 to move, the second splitter 107 is relatively stationary.

In other embodiments, referring to FIGS. 1-3, and FIG. 7, the optical assembly 102 further comprises a first lens 132 configured to collect the pending beam. In this case, the first beam is formed by the pending beam collected by at least part of the first lens 132.

In some embodiments, referring to FIGS. 1-3, when the first lens 132 is configured to collect the pending beam, the second splitter 107 is configured to split the pending beam collected by the first lens 132 to form a first beam and a second beam. The first detection device 102 obtains the first detection information based on the first beam, and the second detection device 106 obtains the second detection information according to the second beam. The optical assembly 102 is configured to move with respect to the second splitter 107, e.g., the mobile device 104 drives the optical assembly 102 to move, the second splitter 107 is relatively stationary. In some embodiments, the pending beam from the first lens 132 may be transmitted via the splitter 202 and converged via the convergence lens 203 to be incident to the second splitter 107. Alternatively, the pending beam from the first lens 132 may be reflected via the splitter 202 and converged via the convergence lens 203 to be incident to the second splitter 107.

In some embodiments, referring to FIG. 7, the optical assembly may further include a second lens 110 configured to collect a second beam. In this case, the second splitter 107 is configured to split the return beam to obtain the second beam. For example, the second beam may be reflected by the mirror 304 to be collected by the second lens 110.

In some embodiments, referring to FIG. 7, the second lens 110 makes the central axis of the second beam parallel to the direction of movement of the optical assembly 102, the second splitter 107 is fixedly connected to the optical assembly 102. In this case that the optical assembly 102 moves, the second lens 110 and the second splitter 107 may move simultaneously.

In some embodiments, referring to FIG. 6 or FIG. 7, the optical assembly includes a lens (e.g., lens 132 of FIG. 6 or lens 110 of FIG. 7), the lens is configured to collect the return light and propagate the return light to the second splitter 107, or the lens is configured to collect a second beam. The second splitter 107 is configured to split the return beam to obtain a second beam. The measurement system may further include a second aperture 109 configured to block a portion of the second beam into the second detection device 106, wherein an angle between the portion of the second beam and the central axis of the second beam is greater than a second preset angle. In other words, a portion of the second beam can enter the second detection device 106, wherein an angle between the portion of the second beam and the central axis of the second beam is smaller than the second preset angle. It should be understood that the second preset angle can be determined according to the actual situation. Here, the second aperture 109 and the second detection device 106 are conjugated with the focal plane of the lens 132 or lens 110.

Specifically, when the lens is configured to collect the return light and propagate the return light to the second splitter, i.e., the embodiment shown in FIG. 6, the lens is the first lens 132; when the lens is configured to collect a second beam, i.e., the embodiment shown in FIG. 7, the lens is a second lens 110.

For example, referring to FIG. 6, the second beam is converged by the convergence lens 301 and is incident to the second diaphragm 109 and the second beam through the second diaphragm 109 is incident to the convergence lens 302, and then incident to the second detection device 106 after being converged by the convergence lens 303.

For example, referring to FIG. 7, the second beam collected by the second lens 110 is reflected by the mirror 305 and then is incident to the convergence lens 306, the second beam is converged by the convergence lens 306 and then is incident to the second diaphragm 109, the second beam through the second aperture 109 is incident to the convergence lens 307, and then incident to the second detection device 106 after being converged by the convergence lens 307.

The second detection device 106 is an imaging device or light intensity detection member. Imaging device includes: a camera or video camera, the light intensity detection component includes a single photodiode or photomultiplier light.

In the embodiment shown in FIG. 6, FIG. 7, when the second detection device 106 is an imaging device or light intensity detection member, the second detection information includes the light intensity of the second beam.

When the second detection device 106 is an imaging device, the second detection information includes: a detection image of the measured area. The second detection information includes one or more of the light intensity of the second beam, the contrast of the detection image, and the diffusion of the detection image.

When the second detection information is the diffusion of the detection image, the diffusion of the feature moment is less than the diffusion of any first moment except the feature moment.

In the embodiments of FIGS. 1-3, 6 and 7, the measured areas detected by the first detection device 103 and the second detection device 106 are same, the actual distance determined by the first detection information obtained according to the first detection device 103 can represent as the height of the measured area, thereby improving the detection accuracy.

Figure 8:
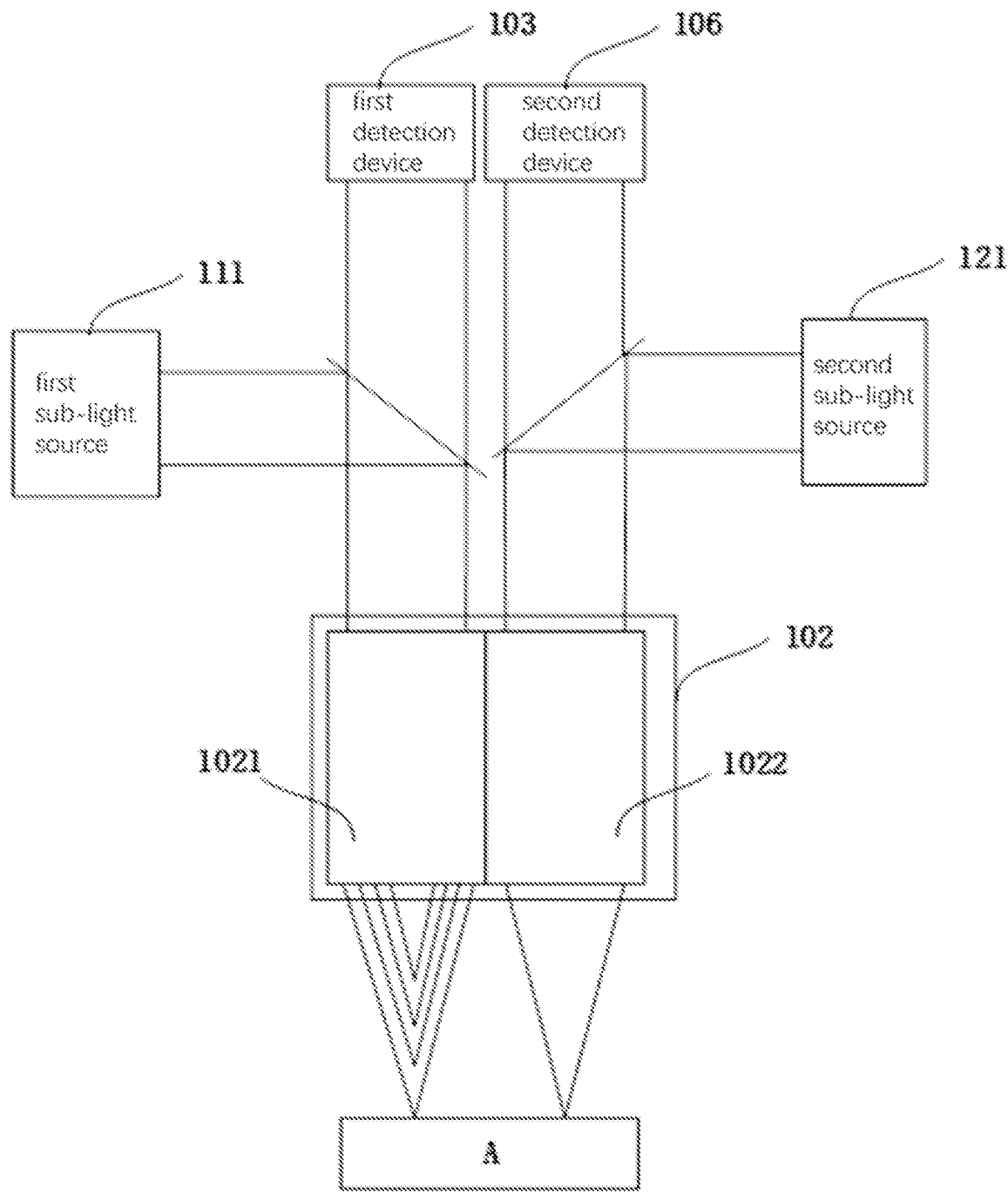
FIG. 8 is a structural view of the measurement system according to some embodiments of the present disclosure.

FIG. 8 is a structural view of a measurement system according to some embodiments of the present disclosure.

As shown in FIG. 8, the light source 101 includes a first sub-light source 111 and a second sub-light source 121. The first sub-light source 111 is configured to produce a first original beam. The second sub-light source 121 is configured to produce a second original beam. In other words, the original beam produced by the light source 101 includes a first original beam and a second original beam.

The return beam returned from the measured area of the measured object A includes the first return beam and the second return beam. The first return beam is the first original beam returned from the measured area of the measured object A. The second return beam is the second original beam returned from the measured area of the measured object A.

The optical assembly 102 includes the first optical assembly 1021 and a second optical assembly 1022 fixedly connected to each other. The first optical assembly 1021 is configured to form a pending beam according to the first return beam. In this case, the first beam is the pending beam. The second optical assembly 1022 is configured to collect a second return beam. In this case, the second beam is the second returning beam.

The first detection device 103 is configured to obtain the first detection information based on the first beam. The second detection device 106 is configured to obtain a second detection information according to the second beam.

In some embodiments, the first optical assembly 1021 is also configured to collect the first original beam, and enable the first original beam arrive to the measured area of the measured object A. The first optical assembly 1021 includes a dispersive prism configured to converge lights with different wavelengths of the first original beam to different positions of the optical axis of the first optical assembly 1021.

The optical axis of the first optical assembly 1021 is the central axis of the first return beam.

In some embodiments, the second optical assembly 1022 is also configured to collect a second original beam, and enable the second original beam to arrive to the measured area. The second optical assembly 1022 includes a dispersive prism configured to converge lights with different wavelengths of the first original beam to different positions of the optical axis of the second optical assembly 1022. In other embodiments, the second optical assembly 1022 may include an interference objective configured to obtain an interference beam according to the second return beam and take the interference beam as a second beam.

In the embodiment shown in FIG. 8, the first detection device 103 is a spectrometer.

The processing system 105 is configured to determine an actual distance between the optical assembly 102 and a fixed plane of the measured object A at each first moment according to the first detection information at each first moment of a plurality of first moments, which includes obtaining the light intensity of each wavelength of the first beam at the first moment by the first detection device 103; obtaining the actual distance according to the wavelength corresponding to the maximum light intensity.

Figure 9:
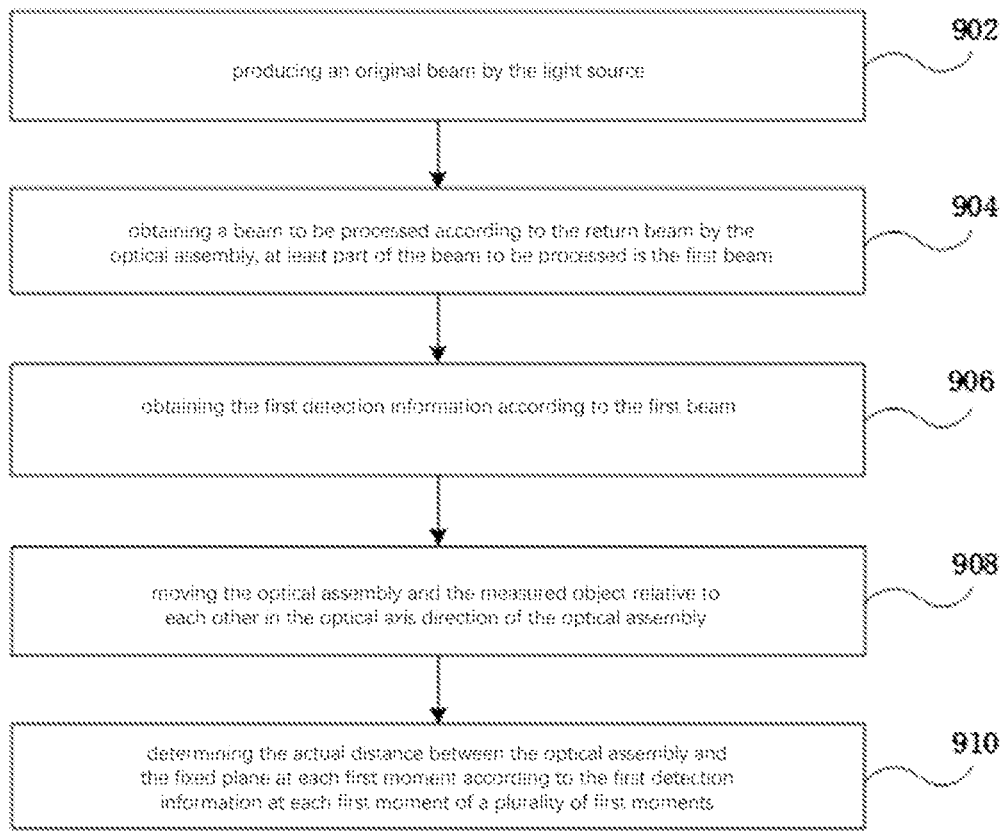
FIG. 9 is a flowchart of a measurement method according to some embodiments of the present disclosure.

FIG. 9 is a flowchart of a measurement method according to some embodiments of the present disclosure. The measurement method may be implemented based on a measurement system of any of the above embodiments.

In step 902, producing an original beam by the light source. Here, the original beam returned from the measured area of the measured object is the return beam. For example, the original beam may include any or combinations of one or more of white, ultraviolet, or infrared light in one or more.

In step 904, obtaining a pending beam based on the return beam by the optical assembly. Here, at least part of the pending beam is the first beam.

For example, the optical assembly may include an interference objective or a confocal objective.

In step 906, obtaining the first detection information based on the first beam.

For example, the first detection device obtains the first detection information based on the first beam. For example, the first detection information includes the intensity of the light with the predetermined wavelength of the pending beam.

In step 908, moving the optical assembly and the measured object relative to each other in the optical axis direction of the optical assembly.

For example, the movement of at least one of the optical assembly and the measured object is driven by controlling the mobile device to drive.

In step 910, determining the actual distance between the optical assembly and the fixed plane at each first moment according to the first detection information at each first moment of a plurality of first moments.

The implementation of step 910 may refer to the above description, and will not be repeated herein.

In the above embodiment, using a plurality of first detection information at the first moment can obtain the actual distance between the optical assembly and the fixed plane of the measured object at each first moment. Subsequent operations can be performed more accurately based on the actual distance between the optical assembly and the fixed plane of the measured object at each first moment, for example, the height information of the measured area of the measured object can be determined more accurately.

Figure 10:
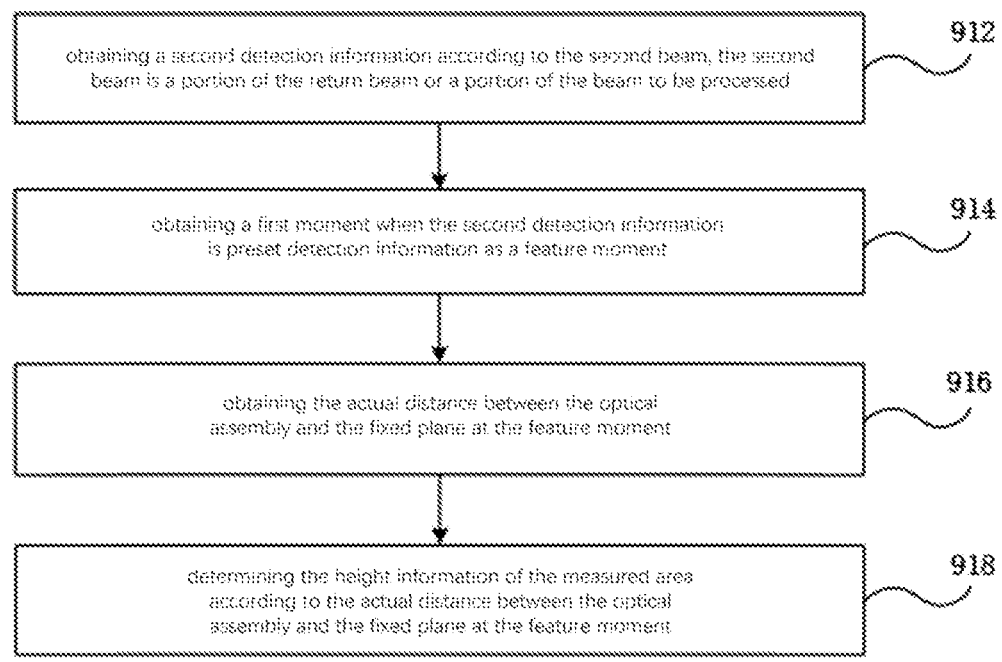
FIG. 10 is a flowchart of a measurement method according to other embodiments of the present disclosure.

In some embodiments, the measurement method shown in FIG. 9 further includes steps 912-step 918 shown in FIG. 10. FIG. 10 is a flowchart of a measurement method according to other embodiments of the present disclosure.

In step 912, obtaining a second detection information according to the second beam, the second beam is a portion of the return beam or a portion of the pending beam, the second detection information characterizes the relative position between the optical assembly and the measured area.

For example, obtaining the second detection information according to the second beam includes: obtaining a detection image according to the second beam; and obtaining the second detection information according to the detection image, the second detection information includes at least one of the light intensity of the second beam and the contrast of the detection image.

In some embodiments, the second detection information includes the light intensity of the second beam; the light intensity of the second beam at the feature moment is greater than the light intensity of the second beam at any of a plurality of the first moments except the feature moment.

In step 914, obtaining a first moment when the second detection information is preset detection information as a feature moment.

In step 916, obtaining the actual distance between the optical assembly and the fixed plane at the feature moment.

In step 918, determining the height information of the measured area according to the actual distance between the optical assembly and the fixed plane at the feature moment.

In some embodiments, the measurement method further comprises: obtaining a topography of the measured object according to the height information of a plurality of measured areas relative to the same datum.

In some embodiments, obtaining a topography of the measured object according to the height information of a plurality of measured areas relative to the same datum includes: repeating the production of the original beam of light source for each measured area; The step of determining the height information of the measured area according to the actual distance between the optical assembly and the fixed surface at the feature moment; obtaining the height information of each measured area relative to the same datum; obtaining the topography of the measured object according to the height information of each measured area relative to the same datum.

For example, the step of obtaining the height information of each measured area relative to the same datum includes: repeating the steps 902 to 918 to obtain the height of each measured area relative to the initial datum; unifying the initial datum of each measured area into the same datum.

Therefore, various embodiments of the present disclosure have been described in detail. In order to avoid obscuring the ideas of the present disclosure, some details known in the art are not described. Those skilled in the art according to the above description can completely understand how to implement the technical solutions disclosed herein.

Those skilled in the art will appreciate that embodiments of the present disclosure may be provided as a method, a system, or computer program product. Thus, the present disclosure may take the form of a complete hardware embodiment, a complete software embodiment, or a combination of software and hardware embodiments. Further, the present disclosure may take the form of a computer program product implemented on one or more computer-available non-transient storage media (including but not limited to disk memory, CD-ROM, optical memory, etc.) which contains computer-usable program code.

Although some specific embodiments of the present disclosure have been described in detail by example, those skilled in the art will appreciate that the above examples are only for illustrative purposes, and not to limit the scope of the present disclosure. Those skilled in the art will appreciate that the above embodiments can be modified or some of the technical features can be replaced equivalently without departing from the scope and spirit of the present disclosure. The scope of the present disclosure is limited by the appended claims.

What is claimed is:

1. A measurement system, comprising:
   a light source configured to produce an original beam, wherein a return beam is formed by the original beam returning from a measured area of a measured object;
   an optical assembly configured to produce a pending beam based on the return beam, wherein at least part of the pending beam acts as a first beam;
   a first detection device configured to obtain first detection information based on the first beam;
   a mobile device configured to move the optical assembly and the measured object with respect to each other in a direction of an optical axis of the optical assembly; and
   a processing system configured to determine, using the first detection information obtained by the first detection device for a first moment, an actual distance between the optical assembly and a fixed plane of the measured object at the first moment,
   wherein the processing system configured to determine an actual distance between the optical assembly and a fixed plane of the measured object at each first moment includes:
      controlling the mobile device such that the optical assembly and the measured object are moved with respect to each other in the direction of the optical axis, so that there are a desired plurality of predetermined distances between the optical assembly and the fixed plane at a plurality of second moments;
      obtaining the first detection information at each second moment of the plurality of second moments; and
      determining the actual distance between the optical assembly and the fixed plane at first moment based on the plurality of predetermined distances and the plurality of first detection information at each second moment.

2. The measurement system according to claim 1, wherein the optical assembly comprises:
   a first splitter configured to divide the original beam into a reference beam and an object beam incident into the measured area, wherein the return beam is formed by the object beam returning from the measured area; and
   a reference mirror configured to propagate the reference beam along a preset trajectory to obtain a pre-interference beam, wherein the pre-interference beam and the return beam are interfered to produce the pending beam;
   wherein the first detection information includes intensity of a light with a predetermined wavelength of the pending beam.

3. The measurement system according to claim 1, wherein the processing system configured to determine the actual distance between the optical assembly and the fixed plane at each first moment based on the plurality of predetermined distances and the plurality of first detection information at each second moment comprises:
   linear processing each predetermined distance of the plurality of predetermined distances to obtain a moving parameter;
   determining a function relationship based on the moving parameter and the first detection information at the plurality of the second moments; and
   determining the actual distance between the optical assembly and the fixed plane at first moment according to the function relationship and the first detection information at the first moments,
   wherein determining a function relationship based on the moving parameter and the first detection information, includes: taking a difference between the moving parameter and a undecided parameter at each second moment as an independent variable and the first detection information at each second moment as the dependent variable to fit a function to be fitted to obtain a fitting function; and the fitting function is the function relationship.

4. The measurement system according to claim 3, wherein the optical assembly comprises:
   a first splitter configured to divide the original beam into a reference beam and an object beam incident into the measured area, wherein the return beam is formed by the object beam returning from the measured area; and a reference mirror configured to propagate the reference beam along a preset trajectory to obtain a pre-interference beam, wherein the pre-interference beam and the return beam are interfered to obtain the pending beam;

the first detection information includes intensity of a light with a predetermined wavelength of the pending beam;

the fitting function is: $I=A+\cos r\,(x-x_0)+B$, wherein the linear process includes being multiplied by $2\Pi/\lambda$, $r=1$; or the linear process includes being multiplied by 1, $r=2\Pi/\lambda$, $\lambda$ is a wavelength of the light with a predetermined wavelength, the processing system configured to take a difference between the moving parameter and the undecided parameter at each second moment as an independent variable and the first detection information at each second moment as the dependent variable to fit a function to be fitted to obtain a fitting function includes:

taking the moving parameter at each second moment as an x of the fitting function, taking the intensity of the light with the predetermined wavelength at each second moment as the/of the fitting function to fit the fitting function to obtain A, the undecided parameter $x_0$ and B to obtain the fitting function, the number of first moments being multiple, a processing system being configured to determine an actual distance between the optical assembly and a fixed plane of the measured object at each first moment, according to the first detection information at each first moment of first moments;

determining the actual distance between the optical assembly and the fixed plane at each first moment according to the fitting function and first detection information at the plurality of the first moments includes:

taking intensity of the light with the predetermined wavelength at each first moment as I in the fitting function to compute the x of the fitting function as the moving parameter at each first moment; and determining the actual distance between the optical assembly and the fixed plane at each first moment according to the moving parameter at each first moment.

5. The measurement system according to claim 2, wherein:

the reference mirror is configured to propagate the reference beam along a preset trajectory by reflecting the reference beam to obtain a pre-interference beam;

the reference mirror and the first splitter are semi-translucent mirrors, and the reference mirror and the first splitter are arranged in parallel; or the reference mirror is a mirror, and wherein the first detection device comprises:

a grating or a filter; and a light intensity detector.

6. The measurement system according to claim 1, wherein the number of first moments is multiple, further comprising:

a second detection device configured to obtain second detection information according to a second beam, the second beam is a portion of the return beam or a portion of the pending beam, the second detection information characterizes a relative distance between the optical assembly and the measured area in the direction of the optical axis of the optical assembly;

the processing system is further configured to obtain a first moment when the second detection information is preset detection information as a feature moment; obtain the actual distance between the optical assembly and the fixed plane at the feature moment; determine height information of the measured area according to the actual distance between the optical assembly and the fixed plane at the feature moment.

7. The measurement system according to claim 6, wherein the second detection device configured to obtain a second detection information according to the second beam comprises:

obtaining a detection image according to the second beam; and obtaining the second detection information according to the detection image, the second detection information includes at least one of light intensity of the second beam and contrast of the detection image.

8. The measurement system according to claim 7, further comprising:

a second splitter configured to split the return beam or the pending beam to obtain the second beam, wherein the second splitter is configured to split the return beam to obtain the second beam and the optical assembly includes a lens configured to collect the return beam and propagate the return beam to the second splitter, or configured to collect the second beam, and wherein the measurement system further comprises:

a second diaphragm configured to block a portion of the second beam into the second detection device, an angle between the portion of the second beam and the central axis of the second beam is greater than a second preset angle, the second diaphragm and the second detection device are conjugated with the focal plane of the lens.

9. The measurement system according to claim 6, wherein:

the original beam includes a first original beam and a second original beam;

the light source includes:

a first sub-light source configured to produce the first original beam, and a second sub-light source configured to produce the second original beam;

the return beam includes a first return beam and a second return beam, the first return beam is the first original beam returned from the measured area, the second return beam is the second original beam returned from the measured area;

the optical assembly includes:

a first optical assembly configured to form the pending beam according to the first return beam, the first beam is the pending beam, and a second optical assembly configured to collect the second return beam, the second beam is the second return beam, the first optical assembly is fixedly connected to the second optical assembly.

10. The measurement system according to claim 9, wherein:

the first optical assembly is further configured to collect the first original beam to enable the first original beam arrive to the measured area;

the first optical assembly includes: a dispersive prism configured to converge lights with different wavelengths of the first original beam to different positions of the optical axis of the first optical assembly.

11. The measurement system according to claim 6, further comprising:

a data acquisition system configured to emit a synchronous trigger signal at each first moment;

the first detection device configured to obtain the first detection information based on the first beam in response to the synchronous trigger signal;

the second detection device configured to obtain the second detection information according to the second beam in response to the synchronous trigger signal.

12. The measurement system according to claim 7, wherein:

the second detection information includes the light intensity of the second beam;

the light intensity of the second beam at the feature moment is greater than the light intensity of the second beam at any first moment of the plurality of the first moment in addition to the feature moment, the second beam having multiple wavelengths.

13. A measurement method comprising:

producing an original beam by a light source, wherein the original beam is returned from a measured area of the measured object as a return beam;

producing a pending beam based on the return beam by an optical assembly, at least part of the pending beam acts as first beam;

obtaining first detection information based on the first beam at a first moment;

moving the optical assembly and the measured object with respect to each other in a direction of an optical axis of the optical assembly; and determining an actual distance between the optical assembly and a fixed plane at the first moment using the first detection information at the first moment;

wherein determining an actual distance between the optical assembly and the measured object at each first moment comprises:

moving the optical assembly and the measured object with respect to each other in the direction of the optical axis, such that there are a desired plurality of predetermined distances between the optical assembly and the fixed plane at a plurality of second moments;

obtaining the first detection information at each second moment of the plurality of second moments; and determining the distance between the optical assembly and the fixed plane at each first moment based on the plurality of predetermined distances and the plurality of first detection information at each second moment.

14. The measurement method according to claim 13, wherein determining the actual distance between the optical assembly and the fixed plane at each first moment based on the plurality of predetermined distances and the plurality of first detection information at each second moment comprises:

linear processing each predetermined distance of the plurality of predetermined distances to obtain a moving parameter;

determining a function relationship based on the moving parameter and the first detection information at the plurality of the second moments;

determining the actual distance between the optical assembly and the fixed plane at first moment according to the function relationship and the first detection information at the first moments, wherein determining a function relationship based on the moving parameter and the first detection information, includes: taking a difference between the moving parameter and a undecided parameter at each second moment as an independent variable and the first detection information at each second moment as the dependent variable to fit a function to be fitted to obtain a fitting function; and the fitting function is the function relationship.

15. The measurement method according to claim 14, wherein the optical assembly includes a first splitter and a mirror, the measurement method further comprising:

dividing the original beam into a reference beam and an object beam incident into the measured area by the first splitter, wherein the return beam is the object beam returned from the measured area returning to the optical assembly; and propagating the reference beam along a preset trajectory to obtain a pre-interference beam by the reference mirror, wherein the pre-interference beam and the return beam are interfered to obtain the pending beam;

the first detection information includes intensity of a light with the predetermined wavelength of the pending beam;

the fitting function is: $I=A+\cos r\,(x-x_0)+B$, wherein the linear process includes being multiplied by $2\Pi/\lambda$, $r=1$; or the linear process includes being multiplied by 1, $r=2\Pi/\lambda$, $\lambda$ is a wavelength of the light with a predetermined wavelength;

taking a difference between the moving parameter and the undecided parameter at each second moment as an independent variable and the first detection information at each second moment as the dependent variable to fit a function to be fitted to obtain a fitting function includes:

taking the moving parameter at each second moment as an x of the fitting function, taking the intensity of the light with the predetermined wavelength at each second moment as the I of the fitting function to fit the fitting function to obtain A, the undecided parameter $x_0$ and B to obtain the fitting function, the number of first moments being multiple, a processing system being configured to determine an actual distance between the optical assembly and a fixed plane of the measured object at each first moment, according to the first detection information at each first moment of first moments;

determining the actual distance between the optical assembly and the fixed plane at each first moment according to the fitting function and first detection information at the plurality of the first moments includes:

taking the intensity of the light with the predetermined wavelength at each first moment as I of the fitting function to compute the x of the fitting function as the moving parameter at each first moment; and determining the actual distance between the optical assembly and the fixed plane at each first moment according to the moving parameter at each first moment.

16. The measurement method according to claim 13, wherein the number of first moments is multiple, further comprising:

obtaining second detection information according to a second beam, the second beam is a portion of the return beam or a portion of the pending beam, the second detection information characterizes a relative position between the optical assembly and the measured area;

obtaining a first moment when the second detection information is preset detection information as a feature moment;

obtaining the actual distance between the optical assembly and the fixed plane at the feature moment; and determining height information of the measured area according to the actual distance between the optical assembly and the fixed plane at the feature moment.

17. The measurement method according to claim 16, wherein obtaining second detection information according to the second beam comprises:

obtaining a detection image according to the second beam; and obtaining the second detection information according to the detection image, the second detection information includes at least one of light intensity of the second beam and contrast of the detection image.

18. The measurement method according to claim 17, wherein:

the second detection information includes the light intensity of the second beam;

the light intensity of the second beam at the feature moment is greater than the light intensity of the second beam at any first moment of the plurality of the first moment in addition to the feature moment, the second beam having multiple wavelengths.

* * * * *